(12) United States Patent
Pepe et al.

(10) Patent No.: US 7,904,354 B2
(45) Date of Patent: Mar. 8, 2011

(54) WEB BASED AUTO BILL ANALYSIS METHOD

(75) Inventors: Thomas F. Pepe, Missouri City, TX (US); Todd M. Dunphy, Missouri City, TX (US)

(73) Assignee: Validas, LLC, Missouri City, TX (US)

( * ) Notice: Subject to any disclaimer, the term of this patent is extended or adjusted under 35 U.S.C. 154(b) by 816 days.

(21) Appl. No.: 11/800,502

(22) Filed: May 4, 2007

(65) Prior Publication Data

US 2008/0275774 A1 Nov. 6, 2008

(51) Int. Cl.
*G07B 17/00* (2006.01)
*G06Q 40/00* (2006.01)
*G07F 19/00* (2006.01)
*H03C 1/52* (2006.01)

(52) U.S. Cl. ............... 705/30; 705/34; 705/40; 455/406

(58) Field of Classification Search .................... 705/34, 705/40; 455/406
See application file for complete search history.

(56) References Cited

U.S. PATENT DOCUMENTS

| | | | |
|---|---|---|---|
| 5,027,388 A | 6/1991 | Bradshaw et al. | |
| 5,093,787 A | 3/1992 | Simmons | |
| 5,659,601 A | 8/1997 | Cheslog | |
| 6,070,150 A | 5/2000 | Remington et al. | |
| 6,144,726 A * | 11/2000 | Cross | 379/114.03 |
| 6,493,685 B1 | 12/2002 | Ensel et al. | |
| 6,574,465 B2 | 6/2003 | Marsh et al. | |
| 6,681,106 B2 | 1/2004 | Marsh et al. | |
| 6,813,488 B2 | 11/2004 | Marsh et al. | |
| 6,885,997 B1 | 4/2005 | Roberts | |
| 6,968,319 B1 | 11/2005 | Remington et al. | |
| 7,072,639 B2 | 7/2006 | Marsh et al. | |
| 7,167,699 B1 | 1/2007 | Kretsinger | |
| 7,269,407 B2 * | 9/2007 | Carmon et al. | 455/406 |
| 7,440,557 B2 * | 10/2008 | Gunderman, Jr. | 379/112.06 |
| 7,657,485 B2 * | 2/2010 | Daidone et al. | 705/40 |
| 2001/0007978 A1 | 7/2001 | Marsh et al. | |
| 2002/0077987 A1 * | 6/2002 | Hasegawa | 705/52 |
| 2002/0082991 A1 * | 6/2002 | Friedman et al. | 705/40 |
| 2002/0087440 A1 | 7/2002 | Blair et al. | |
| 2003/0069845 A1 | 4/2003 | DeWitt et al. | |
| 2003/0225690 A1 * | 12/2003 | Eaton | 705/40 |
| 2004/0019561 A1 | 1/2004 | Eaton | |
| 2004/0044602 A1 * | 3/2004 | Batur et al. | 705/34 |
| 2004/0058668 A1 | 3/2004 | Russell et al. | |

(Continued)

OTHER PUBLICATIONS

Companies implement their own call accounting solutions to ensure telecom-billing accuracy. PRNewswire. Oct. 26, 2005. (Retrieved using Dialog Quicksearch on Sep. 22, 2010).*

*Primary Examiner* — Matthew S Gart
*Assistant Examiner* — Scott A Zare
(74) *Attorney, Agent, or Firm* — Parks & Associates, P.C.

(57) ABSTRACT

Method for automatically analyzing customer's bill, such as cell phone bill, received in electronic format for errors and utilization against company's published plan by third-party on third-party's website for customer. The company's published plan is previously stored on third-party's website. Third-party advises customer of results, in real-time, and provides blind feedback to billing company by type error and utilization. Results and feedback are specific to each customer and billing company, and also provides security for both. Promotional materials are provided to customer for revenue to third-party.

14 Claims, 9 Drawing Sheets

U.S. PATENT DOCUMENTS

| | | |
|---|---|---|
| 2004/0067747 A1* | 4/2004 | Carpenter et al. ............ 455/405 |
| 2004/0078330 A1* | 4/2004 | Henry .............................. 705/40 |
| 2004/0103029 A1* | 5/2004 | McClintock ..................... 705/14 |
| 2004/0133488 A1* | 7/2004 | Daidone et al. ................. 705/34 |
| 2004/0139016 A1 | 7/2004 | Forzley et al. |
| 2004/0172297 A1 | 9/2004 | Rao et al. |
| 2004/0186798 A1* | 9/2004 | Blitch et al. .................... 705/29 |
| 2005/0021398 A1* | 1/2005 | McCleskey et al. ............ 705/14 |
| 2005/0031103 A1* | 2/2005 | Gunderman ............. 379/114.03 |
| 2005/0060261 A1 | 3/2005 | Remington et al. |
| 2005/0065882 A1 | 3/2005 | Remington et al. |
| 2005/0102231 A1 | 5/2005 | Remington et al. |
| 2005/0137910 A1 | 6/2005 | Rao et al. |
| 2005/0152520 A1* | 7/2005 | Logue ...................... 379/114.14 |
| 2005/0216380 A1* | 9/2005 | Morris et al. ................... 705/34 |
| 2005/0273360 A1 | 12/2005 | Drucker et al. |
| 2006/0059021 A1* | 3/2006 | Yulman et al. .................... 705/4 |
| 2006/0089907 A1 | 4/2006 | Kohlmaier et al. |
| 2006/0095372 A1 | 5/2006 | Venkatasubramanian et al. |
| 2006/0095373 A1 | 5/2006 | Venkatasubramanian et al. |
| 2006/0173777 A1 | 8/2006 | Torres et al. |
| 2006/0178941 A1 | 8/2006 | Purnell, III |
| 2007/0185818 A1* | 8/2007 | Nozawa .......................... 705/51 |
| 2009/0055297 A1* | 2/2009 | Gunderman .................... 705/30 |
| 2009/0197568 A1* | 8/2009 | Carpenter et al. ............ 455/406 |

* cited by examiner

Third Party

Submitting by the third party company of the error and utilization report to the billing company for correction of the bill by the customer's name and account number. — 510

Submitting follow up emails by the third party company of the validation and optimization report to the billing company for correction in the customer's name and account number. — 540

Customer

Submitting by the customer of the validation and optimization report to the billing company for correction. — 520

Sending follow up emails to the customer for reminding customer that corrections have been made to customer's account. — 530

Submitting follow up emails by the third party company of the error and utilization report to the customer for customer to send for correction of the billing company. — 550

Fig. 6

WEB BASED AUTO BILL ANALYSIS METHOD

BACKGROUND OF THE INVENTION

1. Field of the Invention

This invention is related to business methods and systems for automatically analyzing in real time a customer's bill, such as a customer's cell phone bill, for errors and utilization of the services or products from the billing company, and providing a report back in real-time to the customer and/or billing company by a third-party providing the corrective actions necessary. The invention is achieved by the billing company, such as a cell phone provider, sending out and/or providing a bill in electronic format to the customer and the customer sending the bill in electronic format to a third-party for the third-party to analyze the customer's bill for errors and utilization of billing received by the customer relative to the billing company's published billing plan previously stored on the third-party's website system.

The analysis of the customer's bill is conducted on the third-party's website system in real-time for errors in the billing and for utilization of the services or products. The analyzed results are prepared into a report to display the results. The customer is advised electronically by displaying in real-time an indication that a report is ready which then allows the customer to enter payment information and/or view promotional materials provided by the third-party and elect to view the promotional materials prior to viewing their report of their analyzed bill for errors and utilization. After reviewing the report of the analyzed bill for errors and utilization, the customer and/or third-party forwards the results of the report to the billing company, such as the cell phone company, for corrective action on the customer's account. After forwarding the report, the third-party destroys the bill received from the customer in electronic format, but collects a summary from all reports generated by category and type of error and utilization by a billing company, but not by individual customer, such as a cell phone user, and stores the collection of summaries for a predetermined time period showing the collective errors and utilization by category for a particular billing company, who can be advised of its collection of errors and utilization. This invention further provides all of the error analysis and utilization analysis of the customer's bill from a billing company by the third-party in real-time, while the customer is online at the third-party's website system. The third-party's summary report generated for the customer is in a format that the customer can forward directly to the billing company for corrective action by the billing company on the customer's account.

2. Description of Related Art

The present invention may be useful in any situation where there are companies, such as cell phone companies, which issue bills to their customer's in large volumes based on published rate plans or services. The prior art required customer's to have significant knowledge about how the industry and/or billing company computed their bills against the rate plans on which the customer's bill was based to even make sense of their bills. Most customer's do not have the knowledge or the data to make such an analysis of their bills against the published rate plan of the billing company, nor do they have the time to do so. Also billing companies, such as cell phone companies, who send out large volumes of bills, have no commercial interest in analyzing the individual bills it sends to its customer's, because it would take too much time and money and it would probably cut into their profit margins.

Because companies bill in mass to a large body of customer's, whose individual bills are relatively small, there is a complete mismatch of interest in the billings and utilization between the customer's billed by the billing companies and the billing companies. This mismatch of interest in the billing errors and utilization errors between the billing companies and the customer's billed, is because there has not been a way to electronically analyze billing errors and utilization in real-time and provide the summary report data individually to the customer's and collectively to the individual billing companies, such as cell phone companies, in a cost effective manner.

While many third-party companies in the prior art have attempted various methods of utilizing and analyzing paper invoices, or credit memorandum or electronic invoices or optical character reader conversions to convert bills into electronic formats for comparison, most have been associated with the building of a baseline template, which analyzes the customer's account in historical time to create a template baseline report. From this historical data, comparisons were made against various billing companies' plans or against the customer's plan. The results were time delayed, however, and were a complicated analysis of the errors and reporting the utilization to the billed customer. These reports were as confusing as the billing company's bill to the customer and did not provide to the customer its analysis in real-time, nor did it provide the analysis to the billing company, such as a cell phone company, for corrective action, which was easy to submit.

Further, because the prior art used historical records, it meant that records were kept over time on the customer which created a security problem both for the customer and for their billing company. The customer's security problem was that it was exposed to potential hacking into the database on which their historical baseline was being kept and the billing company was exposed to liability for loss of the customer's personal data and billing information.

Also most of the prior art was related to customer's being billed by billing companies, not for individual customer's but companies who had many individual users within the company. Therefore the lone customer receiving their individual bill from mass billing company mailings did not have access to a program which could be accessed over the web to assist him in analyzing errors in billing or utilization. Therefore these programs were too expensive, except for companies with many users who could justify the cost of billing analysis for billing errors and utilization reports.

The prior art was also concerned with the generation of payment electronically and otherwise, after the bills had been analyzed and compared against historical billing. In this prior art, after an analysis was completed, it was then passed to an accounts payable system which was needed to pay an invoice or recognize a credit. Clearly, such systems were helpful to companies, but not of much use for individuals.

Also the prior art devised complicated systems and methods, as related to wireless telecommunication data, to receive billing information based on a current rate plan utilizing a transceiver specially configured to store billing information in a processor and process the subscribers billing information to produce organized data on a calling profile record for each telecommunication service being used by the subscriber and then determine the best rate plan which would be most cost-effective based on the historical data generated. Again this approach was useful for companies with many subscribers, but did not have application to individual users.

As the prior art was basically configured for use by companies and organizations, it was by design expensive and would not have application to individual customer's bills, such as individual cell phone customer's.

Further, the prior art systems and methods did not look for a business method which would support some or all of the costs required to support servicing an individually billed customer, and still leave a viable business model for third-party company to operate.

Much of the prior art makes attempts at providing solutions to billing analysis were inefficient and did not provide real-time internet or web analysis to a customer regarding its bill and then provide him real-time solutions to correct its bill with the billing company.

Clearly, the prior art did not address the issue of providing collective summaries of types of errors and utilization by individual billing company through the collection of summary reports for all companies by billing company for a pre-determined time to create a corrective report for a given company, such as a cell phone company, to allow the company to initiate corrective action based on the blind reports by its error and utilization summaries. Nor did the prior art look for outside revenue sources to be used in their business models and methods to help support and create an income stream for a third-party provider based on providing blind summary reports for companies by billing company.

Also the prior art was totally focused on the billing company and the billed customer in its analysis for the correction of billing errors and utilization reporting, and did not look for outside revenue sources to be used in their business models and methods to help support and create an income stream from a third-party based on promotional revenues to help support some of the costs to the billed customer, for making the service affordable to the billed customer.

OBJECTS OF THE INVENTION

It is the object of this invention to overcome the deficiencies and short comings of the prior art and provide a method and system which provides rapid real-time and simplified bill analysis to customer's of mass billing companies, such as cell phone providers, whose bills are based on published rate plans or services, without the customer having significant knowledge of how the industry and/or billing company computes their bills against the rate plan on which the customer bill is based.

It is also an object of this invention to provide methods and systems which would allow a third-party to analyze a customer's bill of relatively low dollar value, which have been mass billed, for billing errors and utilization in real-time and further provide a blind collective summary report to the individual billing company, such as a cell phone company, based on the type billing errors and utilization errors for a particular billing company over a predetermined time.

A further object of this invention is eliminating the need for the creation of a template baseline report based on a customer's historical account data and without using paper invoices, credit memorandum or relying upon any historical customer data to generate a report showing the errors of billing and errors of utilization which were billed to the customer by the billing company.

Yet another object is to create a simple format that the customer can understand, and have it submitted in real-time while they are online at the third-party's website system.

Yet a further object of this invention is to eliminate any historical record keeping of the customer's bill from the billing company to provide security to the customer and to the billing company from exposure to potential database computer hackers, because the individual customer data is deleted at the time the report is generated and no historical data is kept about the customer's bill.

It is a further object of this invention to provide a method for analyzing errors in billing and utilization errors for individual customer's of mass billing companies, such as cell phones providers, without the individual customer having to have access to a program resident on his computer but who can access a third-party website system network to analyze the customer's billing and error utilization at a reasonable cost per report analysis. However, it is also an object to provide billing error analysis and utilization analysis for customer's, who are companies of mass billing clients such as cell phone companies, to allow them the same economical bill error analysis and utilization analysis, at a reasonable price without them having a program resident on their company computers.

Also an object of this invention is to provide a simple payment procedure for the customer to pay for his billing error and utilization error analysis report, at the time he receives the report in real-time over the website server system of a third-party.

A still a further object of this invention is to provide a method and system for using promotional and advertising material from a third-party provider to generate income for the third-party company providing the bill analysis and utilization analysis reports and which provides a benefit to the customer whose bill is being analyzed for errors and utilization and economic benefit to a third-party, which keep costs to customer low.

Still a further object of this invention is to provide a means for providing collective summaries of the types of error and utilization found for an individual billing company through the collection of summary reports taken from the individual customer's reports of billing error and utilization error over a pre-determined time for the creation of a corrective report for a given company, such as a cell phone company. These corrective reports allow the company to initiate corrective action based on the blind summary reports of billing errors and utilization errors and economic benefit to a third-party, which keep costs to customer low.

Other objects, features, advantages, and applications of the present intention will become apparent upon reading the following detailed description of the preferred embodiment of the invention when viewed in conjunction with the drawings and the appended claims, even though reference is made to the invention's use in a cell phone industry environment.

BRIEF DESCRIPTION OF THE DRAWINGS

These and other features, objects, advantages, and applications of the present invention will become more readily apparent from the following detailed description, which should be read in the broadest context with the accompanying drawings, which are listed as follows:

FIG. 6 is a diagrammatic general representation of sending the reports of errors and utilization of FIG. 1 to the billing company by either third-party or customer and follow up procedures.

DETAILED DESCRIPTION

The following embodiments are described by way of a general applications, which could be used for many such applications in various types of industries where electronic bills are available and where the industries have published billing plans available to the public, but also a specific embodiment is shown for cell phone customer's and cell phone provider billings based on the cell phone published rate plans. This invention is not limited to cell phone industry only, rather to all such applications where we're electronic bills can be made available and the billing company publishes a rate plan which is available to the public. Those skilled in this art will recognize and understand that these disclosed methods and systems could be readily adaptable for broader applications without departing from the concept of this invention.

Figure 1:
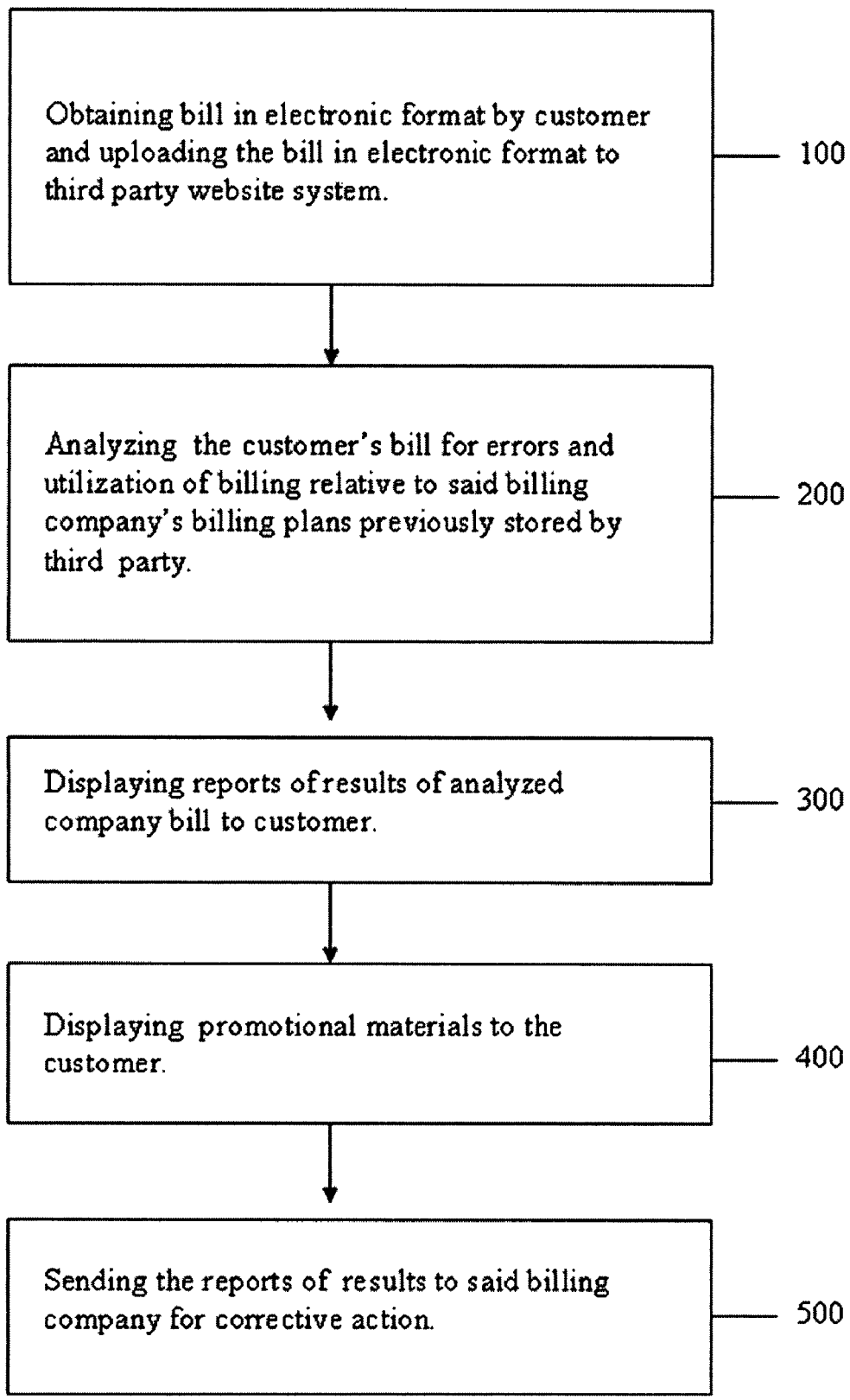
FIG. 1 is a diagrammatic general representation of basic steps of this invention as it applies to generic businesses where billing from that business can be obtained by its customer in electronic format and the billing company has a published plan which can be stored on a third-party computer system.

In the simplest form, one of the preferred embodiments of this invention, as shown in FIG. 1, would have the first step 100 of a customer having a bill in an electronic format which it obtained from his billing company, who has a published rate which is available to the public and against which it bills its customer's. The customer would go to a third-party's website system, which is available to analyze bills for errors and utilization, and upload the bill in electronic format to the third-party's website system. Once the bill has been uploaded to the third-party website system, the third-party's website system performs an analysis of the customer's bill for errors and utilization relative to the billing company's published right plan, which the third-party has previously stored on its system for the purpose of analyzing customer's bills. Then the third-party utilizing its website system performs the second step 200 of analyzing the customer's bill for errors and utilization of the customer's billing relative to the billing company's billing plan, which is publicly available and previously stored in the third-party on its website system. After the analysis of errors and utilization have occurred, the third step 300 of displaying the reports of the analyzed company's bill to the customer who submitted the bill to the third-party company is performed, or at least an indication is given to the customer that the report is ready to be viewed. The customer is then provided the report in real-time after the customer pays the third-party for the error report and utilization report and/ or the step 400 of displaying promotional material is performed. Step 400 of displaying promotional material to the customer may be in the form of an option which allows the customer to option in and option out of viewing promotional materials. In some applications of this invention they treat the customer's opting in to view the promotional materials as payment, and the customer is presented with the error report and utilization report after opting in. After the report has been presented to the customer, the final step of sending the report to the billing company for corrective action on the customer's account step 500 is performed. As will be further explained below, step 500 may be accomplished by the customer sending the report to the billing company or the third-party may send the report directly to be billing company, depending on the industry custom and practice of whether they will accept reports from third parties.

Figure 2:
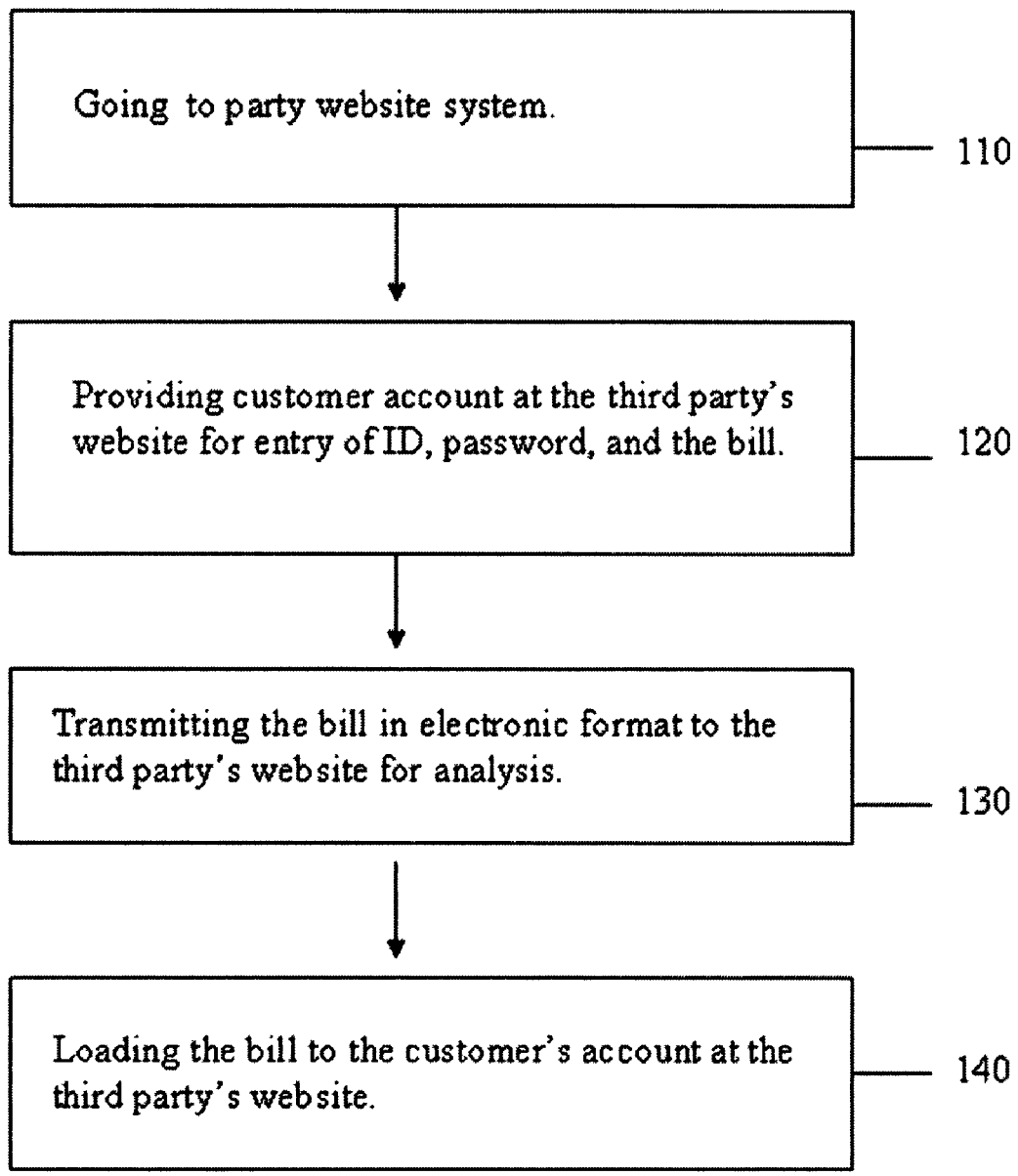
FIG. 2 is a diagrammatic general representation of the up loading steps of FIG. 1 of a customer's electronic bill to a third-party's website system to begin the process for error and utilization validation.

Referring to FIG. 2, the first step 100 of FIG. 1 may have the further expanded step 110 by the customer first going to the third-party's website system through their computer to the public access point on the third-party's website system, which step 120 provides customer an account for formation and the entry of ID, password, and creating a space to receive the customer's bill in electronic format. Once the customer has set up their ID and password, the next step 130 is for the transmitting of their bill in electronic format to the third-party's website system for analysis and the step 140 of loading the bill to the customer's account at the third-party website system.

Figure 3:
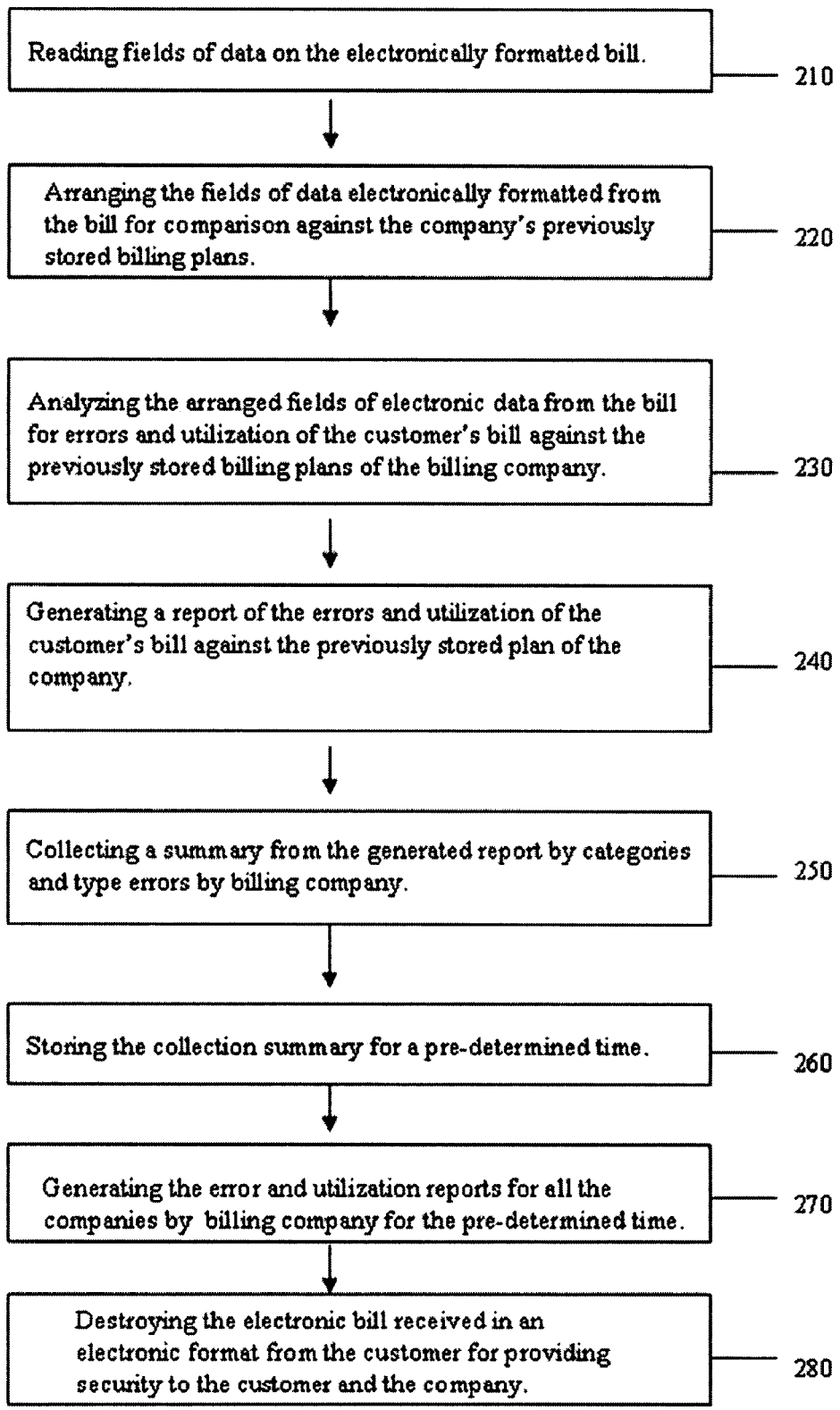
FIG. 3 is a diagrammatic general representation of the analysis steps of FIG. 1 of a customer's electronic bill by a third-party for errors and utilization validation and reporting in preparation for reporting back the results and providing security for the customer and billing company.

The analyzing of the customer's bill from step 200 of FIG. 1. is further expanded by referring to FIG. 3 and referring to step 210 of reading the fields of data on the electronically formatted bill supplied by the customer to their account on the third-party website system. Once the fields of data are electronically formatted, step 220 of arranging the fields of electronic data for comparison against the stored billing plans of the billing companies, is performed. The step 230 is performed for analysis of the errors and utilization of the customer's bill against his billing companies plan can be achieved which allows step 240 of generating a report of the errors and utilization of the customer's bill against the previously stored plan of his billing company to be performed. Also running in the background on the website system of the third-party, is step 250 Of collecting summary from the generated reports by categories and type errors by a billing company and then the website system proceeds to step 260 of storing the collected summaries for a pre-determined time. It should be appreciated by those skilled in the art, that the steps of collecting a summary 250 and storing the collected summary 260 would be blind data not reflecting individual customer's, but only categories of errors and utilization for each individual billing company against its published billing plan and utilization. This data may be used by the third-party website system operator to provide general corrective information to billing companies about the type errors and utilization that are occurring with that particular billing company and it may also be used by the third-party as an income stream to support the business model of this invention of keeping the costs low to the individual customer submitting their bills for analysis of errors and utilization. Finally, the step 280 of the destroying the electronic bill received in electronic format from the customer is taken for providing security to the customer and his billing company, by not having any of the customer's bill being stored for online access by hackers into the third-party website system. It will be understood by those skilled in the art that this means there is no historical data stored by the third-party system about a customer and his bill which provides great security for the customer and their billing company.

Figure 4:
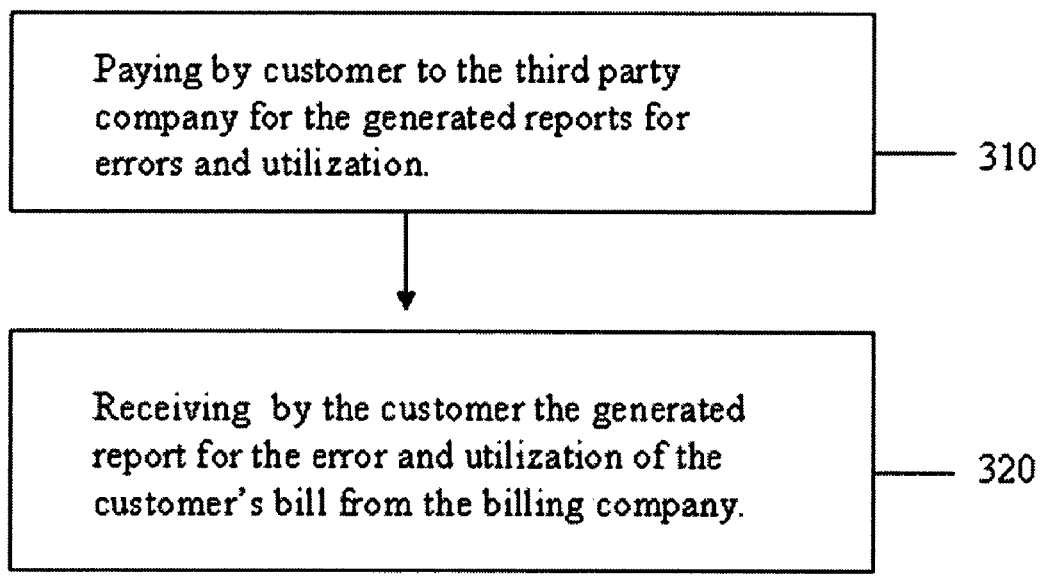
FIG. 4 is another diagrammatic general representation of at least one concept of providing the report of results of the analysis of billing company's bill to the customer by the third-party from FIG. 1.

After generating a report of errors and utilization of customer's bill step 240, a customer who is online and on the third-party's website system, is in substantially real-time advised that their report has been generated. Then referring to FIG. 4 he is offered the step 310 upon paying the third-party company for the generated reports of errors and utilizations and he receives step 320 generated report for the errors and utilization of their bill from the billing company.

Figure 5:
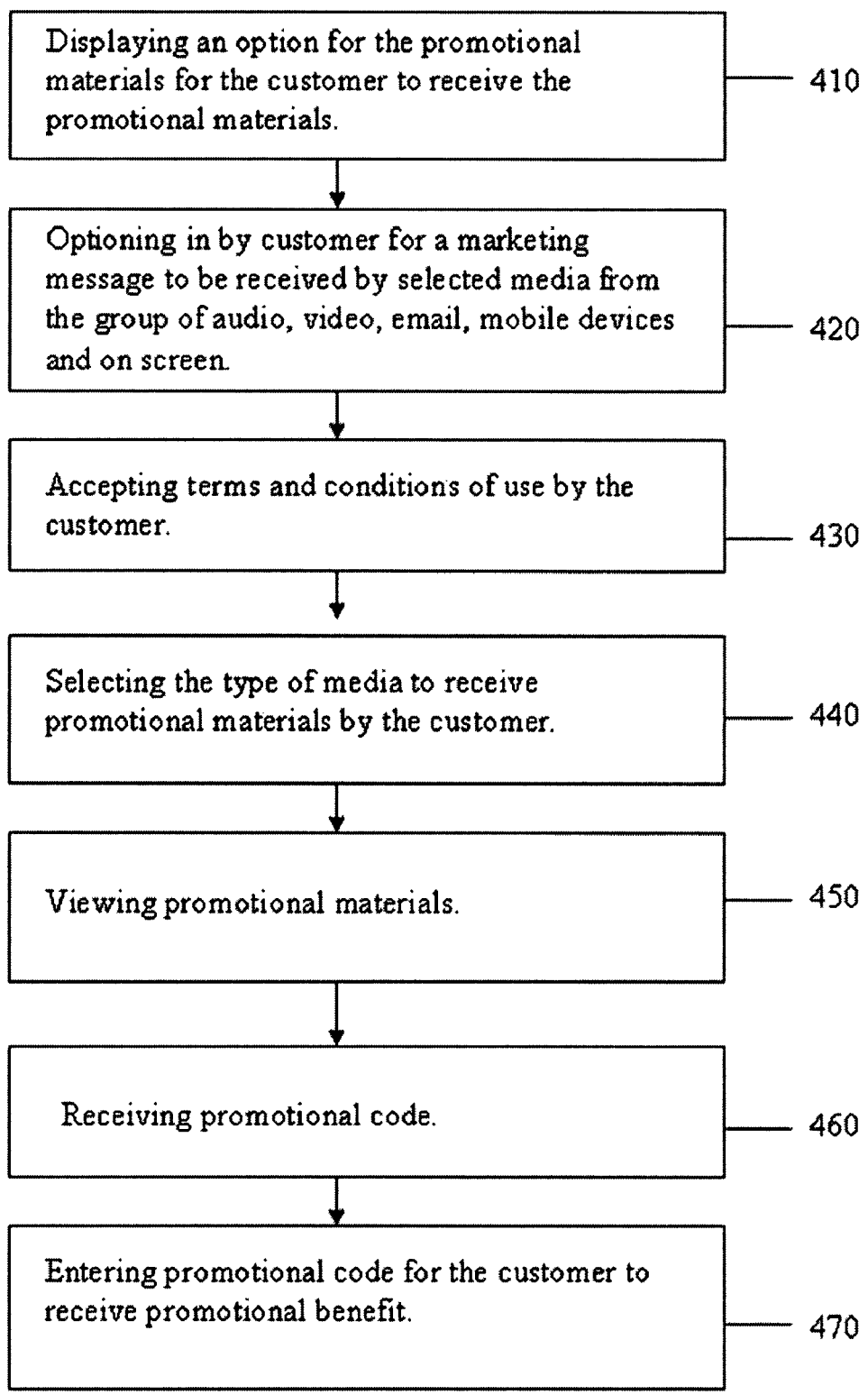
FIG. 5 is a diagrammatic general representation of displaying promotional materials to the customer from FIG. 1.

Further the business model of this invention for keeping the cost low to the customer's wanting correction of their bills for errors and utilization and still provides a reasonable business model for the third-party company, step 400 of FIG. 1, further provides step 410 of FIG. 5 of displaying an option for promotional materials to the customer to receive the promotional materials. Not shown is the path if the customer opts not to view the promotional materials, as he simply skips to step 500, which will be discussed later. This promotional material can be varied from general to targeted and as such is valuable to the third-party and the advertiser, which helps support the business model of keeping the cost low to customer's seeking analysis of their billing errors and utilization. If a customer decides to option in, step 420, to view the promotional material, he is given the choice of having the promotional message delivered from a group of audio, video, email, mobile devices, and/or on screen immediately for receiving the promotional material. The customer further is asked if they accepts the terms and conditions of use, step 430, before proceeding to selecting the type media to view the promotional materials, step 440, which leads to viewing the promotional materials, step 450. As part of the third party's business model for generating income but keeping the cost low to the customer for their error valuation and utilization, the next two steps provide advertisers with positive confirmation that the customer has in fact viewed the promotional material, because these steps are receiving the promotional code, step 460, and entering the promotional code of the customer to receive the promotional benefit, step 470. This means that an advertiser supplying promotion materials has positive confirmation that the customer has viewed advertisers promotional material.

Finally referring to FIG. 6 which further expands step 500 shown in FIG. 1, an option is given the customer of either, step 510, having the third-party company submit their errors and utilization report to billing company for correction of the bill based in the customer's name and account number or, step 520, the customer submits the validation optimization report to the billing company for correction. However in either case 510 or 520, the third-party company sending the follow up email to customer reminds the customer to confirm that the corrections submitted have been made to the customer's account, step 530. Depending on whether 510 or 520 was selected for response, then steps 540 and 550 are followed which respectively are submitting follow up emails either by third-party company to the billing company for correction in the customer's name and account number, or by submitting follow up emails by the third-party company to the customer for the customer to send for corrections to the billing company.

Figure 7:
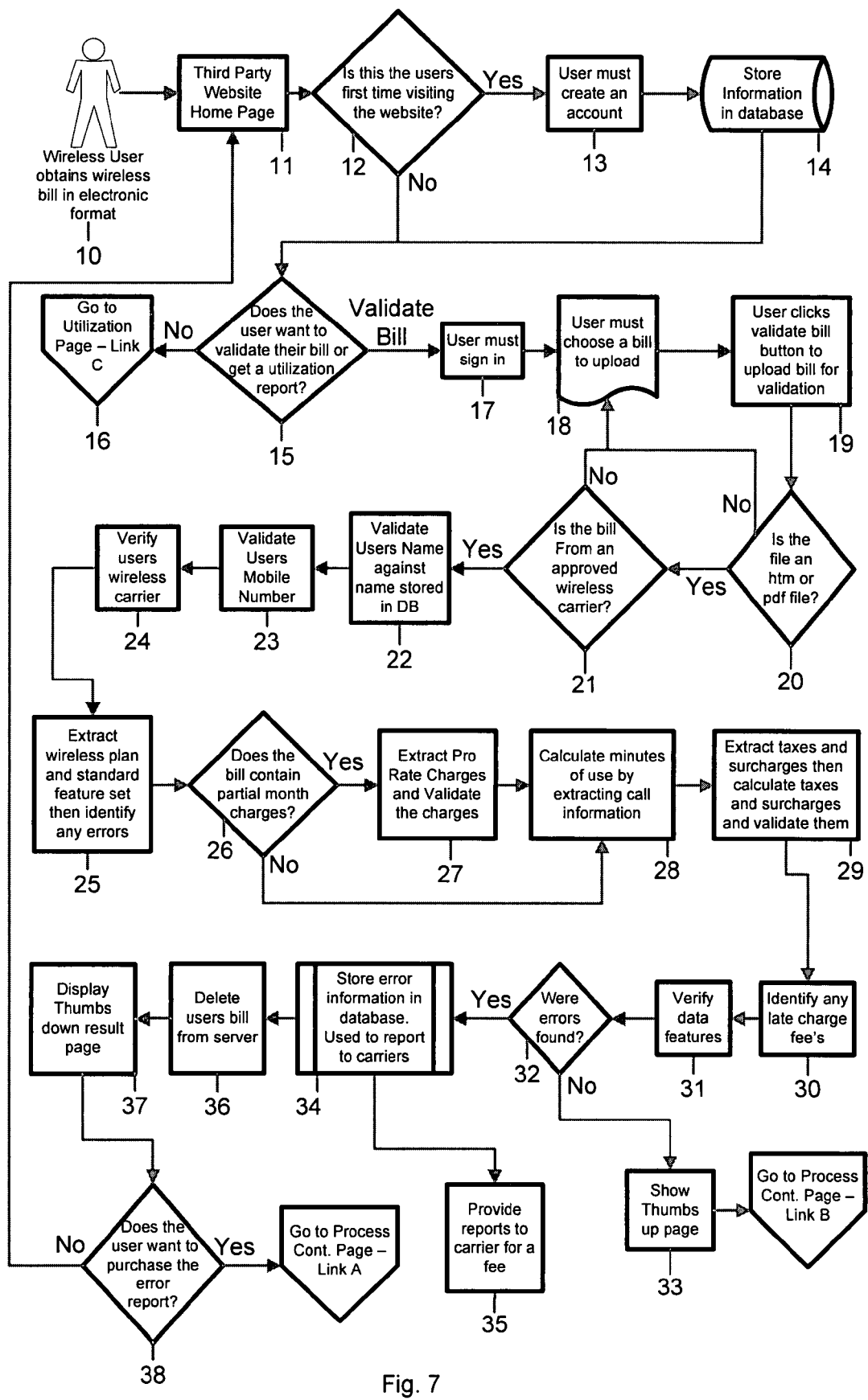
FIG. 7 represents one embodiment for a specific application for cell phone customer and cell phone provider billing.

FIG. 7 contains a more detailed explanation of one embodiment of this invention as it relates to an embodiment for a specific application for cell phone customer's and cell phone provider billing in which the wireless user 10 obtains a phone bill in electronic format from their cell phone service provider, not shown. The wireless user 10, once they have obtained the cell phone bill in electronic format, will go to third-party website, homepage 11. The third-party website inquires, "Is this the users first time visiting the website?" 12. Depending on the cell phone customer's response of "Yes" or "No" he would either proceed to "User must create an account" 13 if their answer was "Yes", and would then be led to "store information in database" 14, where the cell phone customer/user would enter their cell phone number, password, and their cell phone bill. If the cell phone customer/user answered "No" to the inquiry at 12, then they would be directed to the option 15 which asks: "Does the user want to validate their bill or get a utilization report". If the cell phone customer/user elects "Go to utilization page" report option 16, he would be referred to Link C, FIG. 9, which will be further discussed below. If the cell phone customer/user elects validate their bill at option 15, then they would select "User must sign in" 17. It will be understood by those skilled in the art that there may be multiple steps associated with a sign in procedure 17, such as validation of ID, username, and various sub-routines to assist the cell phone customer/user in their sign-on procedure, not shown. Then cell phone customer/users is asked, "User must choose a bill to upload" 18 and after choosing a bill to upload proceeds to "User clicks validate bill button to upload bill for validation" 19 to upload the bill they chose in step 18. All the foregoing steps are examples of one embodiment which could be generally referred to as obtaining a cell phone bill by customer in electronic format and uploading the cell phone bill to third-party's website system, but as those skilled in the art would recognize other specific steps might be used to achieve the general steps of obtaining a cell phone bill and uploading it to the third-party website system.

Figure 8:
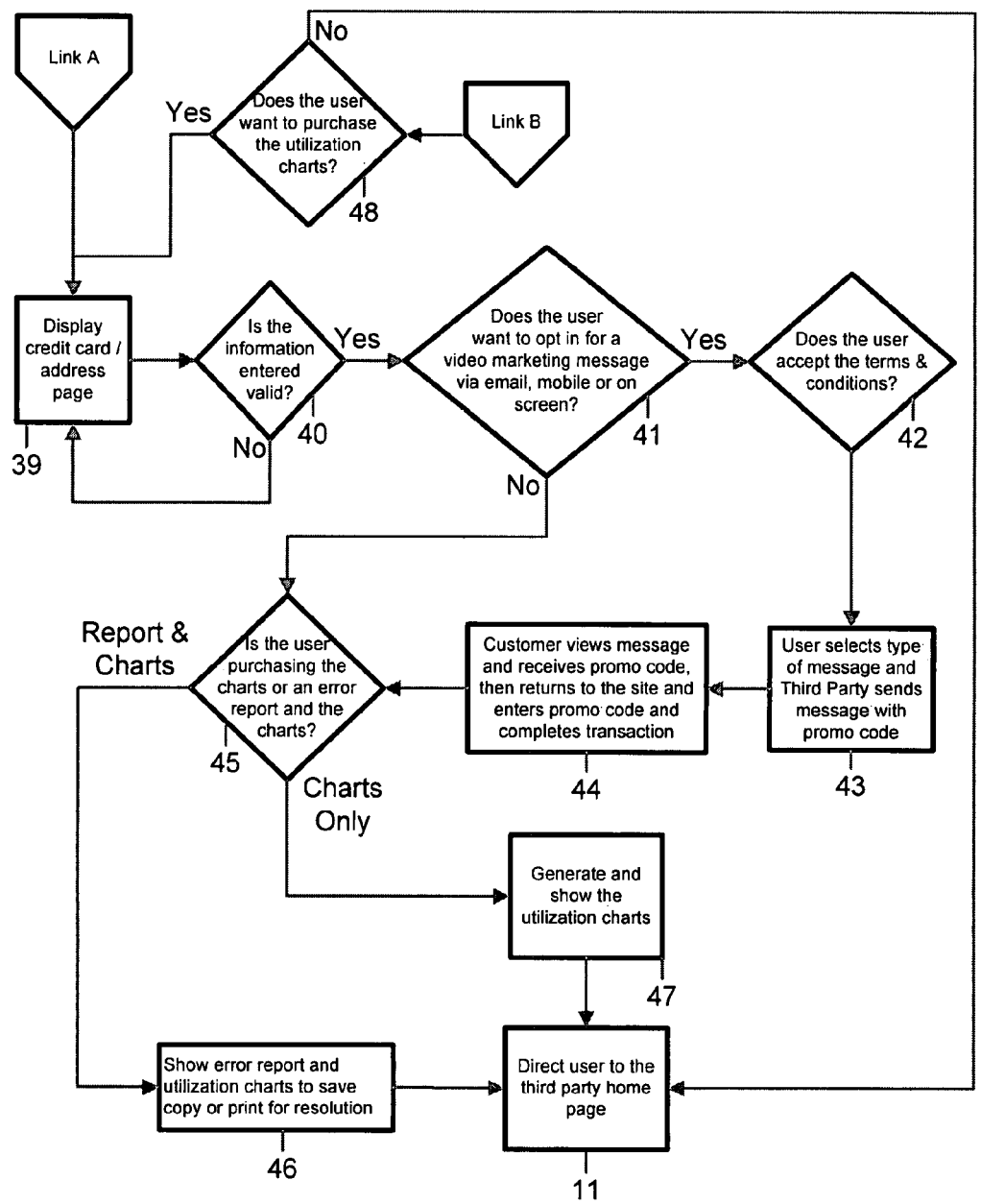
FIG. 8 represents a continuation of FIG. 7 showing billing error reporting and promotional materials generation.

Before a bill uploaded by step 19 can be fully achieved, processes 20, "Is the file an HTM or PDF file" and 21 "Is the bill from an approved wireless carrier?" are run to determine if the third-party's software will be able to perform the step of analyzing the cell phone customer/users cell phone bill. If the answer to steps 20 and 21 is "No" then the user must choose a new bill to upload step 18 and try again. If the answer to 20 and 21 is "Yes" the bill is passed for analysis and validation. While there may be many ways to go about the analysis process, as those skilled in the art would be aware, the analysis process for at least one embodiment herein described is achieved initially with step 22 "Validate users name against name stored in database"; step 23 "Validate users mobile number" and step 24 "Verify users wireless carrier". In this embodiment and throughout the analyzing process fields of data are read on the electronically formatted bill and the data fields are arranged in a pattern which can be compared against previously stored billing plan data of a cell phone provider, which in this embodiment being described would be the cell phone customer/users wireless carrier verified at step 24. Once step 24 is completed in the analysis, the process continues by, "Extract wireless plan and standard features set then identify any errors" step 25. Another subset of analyzing the arranged fields of data is to compare and asked the question, "Does a bill containing partial month charges?" step 26. If the answer is "Yes" any analysis of data fields proceeds to "extract prorate charges and validate the charges" step 27 so that the charges will be prorated and not deviate the data being analyzed or give a false comparison, then the process proceeds to step 28. If the answer to step 26 was "No" then analysis process moved to "Calculate minutes of use by extracting call information" step 28 and to "Extract taxes and surcharges and calculate taxes and surcharges and validate them" step 29, and then to "Identify any late charge fees" step 30 and to "Identify data features" step 31, after which "Were errors found?" step 32. If no errors were found, at least in this embodiment, a screen displays "Show thumbs-up page" step 33 to indicate to the cell phone customer/user that their phone bill is correct and he would be referred to Link B, FIG. 8, which will be further discussed below. If errors were found or the answer was "Yes" in response to the query of step 32, then the analysis proceeds to "Store error information in database by cell phone carrier to be used to report to carrier" step 34, and then the process proceeds "Delete users bill from server" step 36. It should be further explained that this stored information in step 34 is not individual information about the cell phone customer's/user, rather it is generic data error which is collected by type error and by cell phone provider and is blind information relative to the cell phone customer/user. Therefore, this stored error data allows the third-party to "Provide reports to carrier for a fee" step 35, and maintain the cell phone customer/users privacy and data by error type and particular cell phone provider of the accumulated data. The third-party may sell this data to a cell phone provider to help support the business model of keeping the cost low to the cell phone customer's/user for their error information and still provide a successful business model for the third-party provider.

If errors were found in the cell phone customer/users cell phone bill and after running steps 34 and 36 and indication is displayed that an errors have been found in the cell phone customer/users cell phone bill, by displaying on the screen, "Thumbs down results page" step 37. After displaying step 37, the cell phone customer/user is provided the option of asking, "Does the user want to purchase the error report?" step 38. If the answer is "No" the cell phone customer/user is returned to the third-party website homepage 11. If the answer is "Yes", they would be referred to Link A, FIG. 8, where the cell phone customer/user will be ask, "Display credit card/address page" step 39 for the entry of credit card information to affect payment for the error report. If they answer "No" they are fed to Link B and are fed back to a process which asks, "Does the user want to purchase the utilization charts?" step 48. If the answer is "No," the cell phone customer/user is directed back to third-party website homepage 11. If the answer is "Yes" he is directed process step 39 to begin the credit card processing steps to purchase the utilization report and processed along the same lines as the error report. The next procedure is validation of credit card information, "Is the information entered valid?" step 40. If the answer is "No" the cell phone customer/user is routed back to step 39 for re-entry of credit card data. If the answer to step 40 is "Yes" the cell phone customer/user has displayed an option to view promotional materials.

The option to view promotional materials is offered to the cell phone customer/user to view a promotional marketing message "Does the user want to opt in for a video marketing message via email, mobile or on screen?" step 41. If the answer is "Yes" the cell phone customer/user will be asked "Does the user accept the terms and conditions?" step 42, under which the promotional offer will be made, and if excepting the cell phone customer/user is requested "User selects type of message and third-party sends message with promo code" step 43 to be used in the next step where, "Customer views message and receives promo code and then returns to the site and enters promo code and completes transaction" step 44 for the cell phone customer/user to receive the benefit from having viewed promotional message. The benefit can be anything from discounts on products, free products, and are anything an advertiser is willing to give as valuable benefit. The third-party company derives additional income from advertisers to support its business model of providing reasonable cost for cell phone customer/users to have their bills analyzed for correction. It is important to understand that the more reasonable the cost are to the cell phone customer/user to have their bills corrected, the more volume a third-party generates with their business model which generates more advertising and is a self upward spiraling generator of this business model. Further, the advertisers know their promotional materials are being viewed because in step 44 the customer uses the message and receives an additional promo code which he must enter to complete the transaction. This positive confirmation of having viewed this promotional material makes it exceptionally valuable to advertisers.

After the cell phone customer/user leaves step 44 he is offered the option "Is the user purchasing the charts or an error report and the chart?" step 45. If the cell phone customer/user opts for reports and charts he is passed to "Show error report and utilization charts. To save copy or print for resolution" step 46, is performed. If at step 45 the cell phone customer/users had opted to see only the utilization charts, then they would have been passed to the process "Generate and show the utilization charts" step 47 would be performed before passing the cell phone customer/easier to step 11 directing the cell phone customer/user to the third-party website homepage.

Figure 9:
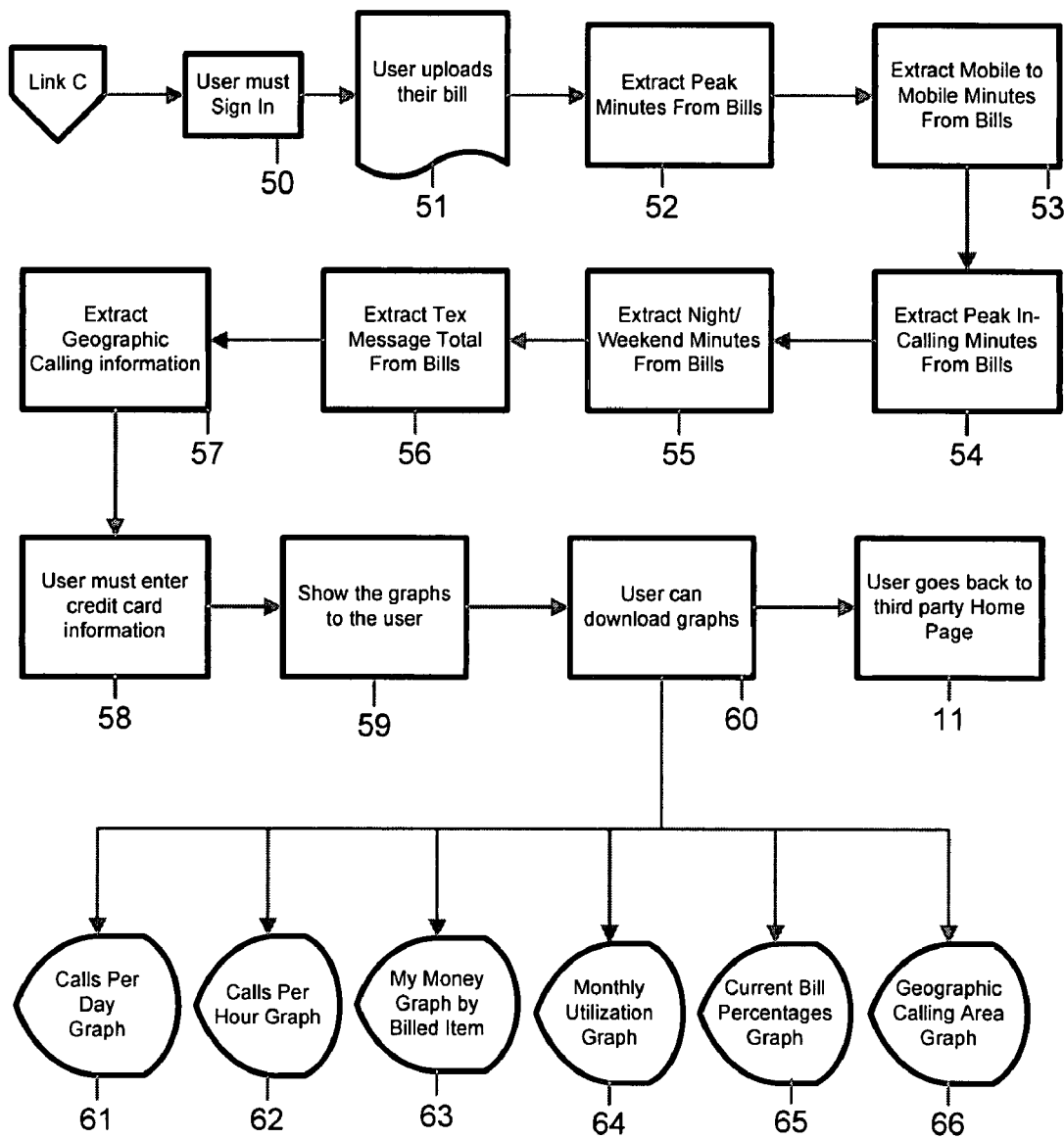
FIG. 9 represents a continuation of FIG. 7 showing utilization reporting and the type data which can be generated for utilization reporting.

If the cell phone customer/user elects above to, "Go to utilization page" report option 16, they would have been referred to Link C, FIG. 9, which will be described now. In this procedure, the user must follow the procedure "User must sign in" step 50 and "User uploads their bill" the step 51, which substantially follows the steps in FIG. 7 at reference numerals 17, 18, and 19. Then, not shown, analysis occurs similar to that in FIG. 7, but the results are different in that the analysis extraction process, at least in this embodiment, extracts "Peak minutes from bills" step 52, "mobile to mobile minutes from bills" step 53, "Peak in calling minutes from bills" step 54, "Night/weekend minutes from bills" step 55, "text message totals from bills" step 56, and "Geographic calling information" step 57. Then user must enter credit card information step 58 and go through similar procedures from FIG. 7 steps 39, steps 40. While the promotional materials process steps are not shown, those skilled in the art would know how to extract the similar procedures for providing promotional option in and option out of promotion materials as discussed above. The third-party's website server system would "Show the graphs to the user" at step 59, and "User can download graphs" step 60. The graphs by general discussion, not limitation are shown as "Calls per day graph" 61, "Calls per our grass" 62, "My money graph billed items" 63, including such items as plan costs, surcharge, taxes etc., "Monthly utilization grant" 64 including text message sent, text message received, peak minutes, mobile-to-mobile minutes etc., "Current bill percentage graphs" 65, and "Geographic calling area graph" 66.

From the foregoing preferred embodiments of this invention which have been described in specific details with references to specific disclosures and embodiments, it will be understood that there are many variations and modifications which may be used and still be within the spirit and scope of this invention as described in the attached claims.

That claimed is:

1. A computer-implemented method run on a third-party's website system server computer for real-time automatic analysis of a bill for errors and utilization from bills of billing companies generated in electronic format by a billing company over the internet to said third-party's website system server computer and said third-party's website system server computer having loaded in its memory public published billing plans of billing companies previously stored on said third-party's website system server computer for providing analysis and feedback which are specific to each bill analyzed and each billing company by a third-party on behalf of a submitter of said bill and advising the submitter of results and providing feed back to billing companies which are specific to each bill and each billing company, while providing security for both, and for providing promotional materials to said bill submitter comprising:
- a. receiving a log-on request at a third-party's website system server computer from a submitter of a bill generated in electronic format by a billing company for analysis of errors and utilization,
- b. providing space on said third-party's website system server computer at said third-party's website for entry of ID, password and said bill by said submitter of said bill,
- c. loading said bill generated in electronic format by said billing company to said third-party server computer website system for analysis of errors and utilization,
- d. reading fields of data on said bill generated in electronic format by said billing company from said third-party's website system server computer,
- e. arranging said fields of data electronically formatted from said bill into memory for comparison against said billing company's previously stored public published billing plans,
- f. analyzing said arranged fields of electronic data in memory from said bill for errors and utilization on said bill against said previously stored published pubic billing plans of said billing company,
- g. generating a report from said third-party's website system server computer of said errors and utilization of said bill against said previously stored published public plan of said billing company,
- h. displaying said error and utilization report of results of analyzed billing company bill from said third-party's website system server computer while said bill submitter is logged on said third-party's website system server computer,
- i. displaying promotional materials from said third-party's website system server computer to said bill submitter, and
- j. sending said error and utilization report from said third-party's website system server computer to said billing company for corrective action,
- k. collecting a summary in memory from said generated reports, wherein the summary is organized by categories and error type of each billing company for all billing companies analyzed by said third-party's website system server computer for a predetermined time,
- l. storing said collection summary on said third-party's website system server computer for a predetermined time, and
- m. generating from said third-party's website system server computer an error and utilization report summary for each billing company analyzed by said third-party's website system server computer, wherein each error and utilization report summary relates to a single, specific billing company, and wherein each error and utilization report summary comprises collective errors and utilization of said specific billing company for said predetermined time.

2. The method of claim 1 further comprising:
- a. said bill submitter paying by electronic payment through said third-party's website server computer to said third-party company for said generated report for errors and utilization of said bill,
- b. displaying an option by said third-party's website system server computer for said promotional materials to said bill submitter to receive said promotional materials,
- c. displaying by said third-party's website system server computer to said bill submitter said generated report for said error and utilization of said bill from said billing company, while bill submitter is logged on said server computer, and
- d. submitting by said third-party's website system server computer said error and utilization report of said bill to said billing company for correction of said bill submitted.

3. The method of claim 2 wherein said submitting of said error and utilization report to said billing company for correction comprises:
- a. submitting by said third-party's website system server computer said error and utilization report of said bill to said billing company for correction of said bill by said submitter's name and account number.

4. The method of claim 2 wherein said submitting of said error and utilization report to said billing company for correction comprises;
- a. submitting by said third-party's website system server computer follow up emails regarding said error and utilization report of said bill to said billing company for correction in said submitter's name and account number.

5. The method of claim 2 wherein said submitting of said error and utilization report to said billing company for correction comprises:
- a. submitting by said third-party's website system server computer follow up emails on said error and utilization report of said bill to said bill submitter for said bill submitter to send for correction by said billing company.

6. The method of claim 2 wherein displaying an option for said promotional materials for said bill submitter to receive said promotional materials further comprises:
- a. optioning in through said third-party's website system server computer by bill submitter for a marketing message to be received by selected media,
- b. accepting through said third-party's website system server computer terms and conditions of use by said bill submitter,
- c. selecting through said third-party's website system server computer said type of media to receive promotional materials by said bill submitter,
- d. viewing through said third-party's website system server computer promotional materials,
- e. displaying by said third-party's website system server computer a promotional code, and
- f. entering through said third-party's website system server computer said promotional code for said bill submitter to receive promotional benefit.

7. The method of claim 6 wherein selected media further comprises:
- a. selecting through said third-party's website system server computer from the group of audio, video, email, mobile devices, and on screen.

8. A computer-implemented method run on a third-party's website system server computer for real-time automatic analysis of a cell phone bill for errors and utilization from bills of billing companies generated in electronic format by a cell phone company over the internet to said third-party's website system server computer and said third-party's website system server computer having loaded in its memory public published billing plans of cell phone companies previously stored on said third-party's website system server computer for providing analysis and feedback which are specific to each cell phone bill analyzed and each cell phone billing company by a third-party on behalf of a submitter of said cell phone bill and advising the submitter of results and providing feed back to cell phone billing companies which are specific to each cell phone bill and each cell phone billing company, while providing security for both, and for providing promotional materials to said bill submitter comprising:
  a. receiving a log-on request at a third-party's website system server computer from a submitter of a cell phone bill generated in electronic format by a cell phone billing company for analysis of errors and utilization,
  b. providing space on said third-party's website system server computer at said third-party's website for entry of ID, password and said cell phone bill by said submitter of said cell phone bill,
  c. loading said cell phone bill generated in electronic format by said cell phone billing company to said third-party server computer website system for analysis of errors and utilization,
  d. reading fields of data on said cell phone bill electronically formatted by said cell phone billing company from said third-party's website system server computer,
  e. arranging said fields of data electronically formatted from said cell phone bill into memory for comparison against said cell phone billing company's public published previously stored billing plans,
  f. analyzing said arranged fields of electronic data in memory from said cell phone bill for errors and utilization on said bill against said previously stored published public billing plans of said cell phone billing company,
  g. generating a report from said third-party's website system server computer of said errors and utilization of said cell phone bill against said previously stored published public plan of said cell phone billing company,
  h. displaying said error and utilization report of results of analyzed cell phone billing company bill from said third-party's website system server computer while said bill submitter is logged on said third-party's website system server computer,
  i. displaying promotional materials from said third-party's website system server computer to said cell phone bill submitter,
  j. sending said error and utilization report from said third-party's website system server computer to said cell phone billing company for corrective action,
  k. collecting a summary in memory from said generated reports, wherein the summary is organized by categories and error type of each cell phone billing company for all cell phone billing companies analyzed by said third-party's website system server computer for a predetermined time,
  l. storing said collection summary on said third-party's website system server computer for a predetermined time, and
  m. generating from said third-party's website system server computer an error and utilization report summary for each cell phone billing company analyzed by said third-party's website system server computer, wherein each error and utilization report summary relates to a single, specific cell phone billing company, and wherein each error and utilization report summary comprises collective errors and utilization of said specific cell phone billing company for said predetermined time.

9. The method of claim 8 further comprising:
  a. said cell phone bill submitter paying by electronic payment through said third-party's website server computer to said third-party company for said generated report for errors and utilization of said cell phone bill,
  b. displaying an option through said third-party's website system server computer for said promotional materials to said bill submitter to receive said promotional materials,
  c. displaying by said third-party's website system server computer to said bill submitter said generated report for said error and utilization of said bill from said cell phone billing company, while bill submitter is logged on said third-party's website system server computer, and
  d. submitting by said third-party's website system server computer said error and utilization report of said bill to said cell phone billing company for correction of said bill submitted.

10. The method of claim 9 wherein said submitting of said error and utilization report to said cell phone billing company for correction comprises:
  a. submitting by said third-party's website system server computer said error and utilization report of said cell phone bill to said cell phone billing company for correction of said cell phone bill by said submitter's name and account number.

11. The method of claim 9 wherein said submitting of said error and utilization report to said cell phone billing company for correction comprises;
  a. submitting by said third-party's website system server computer follow up emails regarding said error and utilization report of said cell phone bill to said cell phone billing company for correction in said submitter's name and account number.

12. The method of claim 9 wherein said submitting of said error and utilization report to said cell phone billing company for correction comprises:
  a. submitting by said third-party's website system server computer follow up emails on said error and utilization report of said cell phone bill to said bill submitter for said bill submitter to send for correction by said cell phone billing company.

13. The method of claim 9 wherein displaying an option for said promotional materials for said bill submitter to receive said promotional materials further comprises:
  a. optioning in through said third-party's website system server computer by bill submitter for a marketing message to be received by selected media,
  b. accepting through said third-party's website system server computer terms and conditions of use by said bill submitter,
  c. selecting through said third-party's website system server computer said type of media to receive promotional materials by said bill submitter,
  d. viewing through said third-party's website system server computer promotional materials,
  e. displaying by said third-party's website system server computer a promotional code, and
  f. entering through said third-party's website system server computer said promotional code for said bill submitter to receive promotional benefit.

14. The method of claim 13 wherein selected media further comprises:
  a. selecting through said third-party's website system server computer from the group of audio, video, email, mobile devices, and on screen.

* * * * *